(12) United States Patent
Takayanagi

(10) Patent No.: US 10,535,848 B2
(45) Date of Patent: Jan. 14, 2020

(54) BATTERY SPACER

(71) Applicant: FDK CORPORATION, Tokyo (JP)

(72) Inventor: Mika Takayanagi, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 15/764,477

(22) PCT Filed: Aug. 18, 2016

(86) PCT No.: PCT/JP2016/074132
§ 371 (c)(1),
(2) Date: Mar. 29, 2018

(87) PCT Pub. No.: WO2017/056772
PCT Pub. Date: Apr. 6, 2017

(65) Prior Publication Data
US 2018/0287107 A1 Oct. 4, 2018

(30) Foreign Application Priority Data
Sep. 29, 2015 (JP) .................................. 2015-191559

(51) Int. Cl.
*H01M 2/10* (2006.01)
*H01M 2/02* (2006.01)
(Continued)

(52) U.S. Cl.
CPC ........... *H01M 2/105* (2013.01); *H01M 2/022* (2013.01); *H01M 2/04* (2013.01); *H01M 2/10* (2013.01);
(Continued)

(58) Field of Classification Search
CPC ............ H01M 2/02; H01M 2/18; H01M 2/30; H01M 2/022; H01M 2/04; H01M 2/1033; H01M 2/10; H01M 2/105
See application file for complete search history.

(56) References Cited

U.S. PATENT DOCUMENTS

| 3,990,919 A | 11/1976 | Krueger | |
|---|---|---|---|
| 4,863,812 A * | 9/1989 | Ueda | H01M 2/1022 429/9 |
| 2006/0073382 A1* | 4/2006 | Urano | H01M 2/0404 429/161 |

FOREIGN PATENT DOCUMENTS

| JP | 3-67457 | * | 3/1991 |
|---|---|---|---|
| JP | 3-67457 A | | 3/1991 |

(Continued)

OTHER PUBLICATIONS

WO 2013/014785 MT (Year: 2013).*
(Continued)

*Primary Examiner* — Alexander Usyatinsky
(74) *Attorney, Agent, or Firm* — Kinney & Lange, P.A.

(57) ABSTRACT

A battery spacer includes: a storage case having a bottomed cylindrical shape in which a battery is stored; a lid part which closes an opening of the storage case; and a positive electrode relay terminal which is provided to the lid part, a part of which protrudes from a top surface of the lid part, and which abuts on a positive electrode terminal of the battery in the storage case. The lid part has a protruding section formed which protrudes further to the battery side than a terminal contact surface at which the positive electrode terminal of the battery abuts on the positive electrode relay terminal. The protruding section has a protruding length h, in the axial direction of the battery, from the terminal contact surface, shorter than the length H of the positive electrode terminal of the battery, and has an annular shape having a diameter R that is larger than the diameter r of the positive electrode terminal of the battery and is smaller than the diameter S of the battery in the radial direction of the battery.

2 Claims, 9 Drawing Sheets

(51) Int. Cl.
    *H01M 2/04*         (2006.01)
    *H01M 2/18*         (2006.01)
    *H01M 2/30*         (2006.01)

(52) U.S. Cl.
    CPC ........... *H01M 2/1033* (2013.01); *H01M 2/18* (2013.01); *H01M 2/30* (2013.01)

(56) References Cited

FOREIGN PATENT DOCUMENTS

| | | | |
|---|---|---|---|
| JP | 03067457 | * | 3/1991 |
| JP | 06-058550 | | 1/1994 |
| JP | 3039798 | * | 7/1997 |
| JP | 3039798 U | | 7/1997 |
| WO | 2013014785 A1 | | 1/2013 |
| WO | WO 2013/014785 | * | 1/2013 |

OTHER PUBLICATIONS

Extended European Search Report dated Jan. 31, 2019, received for corresponding European Application No. 16850948.7.
International Search Report and Written Opinion dated Oct. 4, 2016, for corresponding PCT Application No. PCT/JP2016/074132.

* cited by examiner

BATTERY SPACER

CROSS REFERENCE TO RELATED APPLICATIONS

The present application is the national phase of PCT Application No. PCT/JP2016/074132, filed on Aug. 18, 2016, which in turn claims priority from Japanese Patent Application No. 2015-191559, filed on Sep. 29, 2015, the entire contents thereof being incorporated herein by reference.

BACKGROUND

Technical Field

The present invention relates to a battery spacer, and more specifically, to a battery spacer capable of converting the size of a cylindrical battery.

Background Art

Cylindrical batteries have been used as power sources for various electric apparatuses. The sizes of such cylindrical batteries are determined on the basis of the international standards or Japanese Industrial Standards. An electric apparatus conventionally includes a battery chamber for loading a battery therein. The internal shape of the battery chamber is adapted to a specific standard cylindrical battery. Therefore, for an electric apparatus including a battery chamber adapted to a D size battery, a different-sized battery such as an AA size battery cannot be used, for example.

Meanwhile, when battery exchange is required in an electric apparatus, an inconvenience situation in which any battery having an appropriate size is not found on the spot may often occur. To avoid such an inconvenience situation, various devices (battery spacers) for converting battery sizes have been proposed.

For example, a battery spacer represented by Japanese Utility Model Laid-Open No. 06-058550 includes a plug body having a storage part for storing a battery, and a lid for closing the storage part of the plug body with a battery stored therein.

The outer shape of the plug body is the same as the outer shape of a battery which is larger in size than a battery to be stored in the storage part. For example, a battery spacer is known in which the entire outer shape of a plug body has the same standard dimension as that of a D size battery, and a AA size battery is stored in a storage part. In this battery spacer, since the size conversion from a AA battery size to a D size battery is possible, an AA size battery can be used by being regarded as a D size battery.

The specific structure of this battery spacer is as follows.

The plug body has a cylindrical shape the same as the shape of a D size battery, and has one end of the outer surface which is provided with an outer positive electrode terminal. A space capable of holding an AA size battery is provided as the storage part in the plug body. An inner surface of one end of the storage part is provided with an inner positive electrode terminal. The inner positive electrode terminal is in electrical conduction with the outer positive electrode terminal.

On the other hand, a lid is located at the other end opposite to the one end of the plug body, and has an outer negative electrode terminal on the outer surface of the lid. In addition, the inner surface of the lid is provided with an inner negative electrode terminal in electrical conduction with the aforementioned outer side negative electrode terminal.

In this battery spacer, after an AA size battery is stored in the storage part of the plug body, the storage part is closed with the lid. The positive electrode terminal of the stored battery is in contact with the inner positive electrode terminal in the storage part, and the negative electrode terminal of the stored battery is in contact with the inner negative electrode terminal of the storage part. As a result, the outer positive electrode terminal of the battery spacer and the positive electrode terminal of the AA size battery in the storage part are at the same potential, and the outer negative electrode terminal of the battery spacer and the negative electrode terminal of the AA size battery in the storage part are at the same potential.

The aforementioned battery spacer storing the AA size battery is loaded in a battery chamber of an electric apparatus for D size batteries, and is used by being regarded as a D size battery. That is, even in a case where there is only an AA size battery on the spot when battery exchange is required in an electric apparatus dedicated to D size batteries, the electric apparatus can be driven with use of the AA size battery having undergone size conversion to a D size battery by the battery spacer.

In the aforementioned battery spacer, when a battery is stored in the storage part, the battery may be incorrectly inserted such that the battery is directed to a direction opposite to the normal direction. When a user does not notice the incorrect insertion of the battery, the battery spacer with the positive electrode and the negative electrode thereof inversely directed is loaded in a battery chamber of an electric apparatus. In this case, the positive electrode and the negative electrode of the battery loaded in the battery chamber are substantially inverted. Accordingly, the electric apparatus cannot be driven, and further, even a failure of the electric apparatus may be caused.

SUMMARY

A battery spacer includes: a battery storage part having a bottomed cylindrical shape in which a battery is stored; a lid part which closes an opening of the battery storage part; and a positive electrode relay terminal which is provided to the lid part, a part of which protrudes from a top surface of the lid part, and which abuts on a positive electrode terminal of the battery in the battery storage part, wherein the lid part has a protruding section formed which protrudes further toward the battery side than a surface of the positive electrode relay terminal to abut on the positive electrode terminal of the battery, and the protruding section has a protruding length, in an axial direction of the battery, from the surface of the positive electrode relay terminal to abut on the positive electrode terminal, shorter than a length of the positive electrode terminal of the battery, and is formed in a range outside the positive electrode terminal of the battery but inside an outer circumferential surface of the battery in a radial direction of the battery.

DETAILED DESCRIPTION

The present disclosure has been made in view of the aforementioned circumstances, and an object of the present disclosure is to provide a battery spacer with which a failure of an electric apparatus can be prevented even when a battery with positive and negative electrodes thereof incorrectly directed is inserted in the battery spacer.

In order to achieve the above object, the present disclosure provides a battery spacer including: a battery storage part having a bottomed cylindrical shape in which a battery is stored; a lid part which closes an opening of the battery storage part; and a positive electrode relay terminal which is provided to the lid part, a part of which protrudes from a top surface of the lid part, and which abuts on a positive electrode terminal of the battery in the battery storage part, wherein the lid part has a protruding section formed which protrudes further toward the battery side than a surface of the positive electrode relay terminal to abut on the positive electrode terminal of the battery, and the protruding section has a protruding length, in an axial direction of the battery, from the surface of the positive electrode relay terminal to abut on the positive electrode terminal, shorter than a length of the positive electrode terminal of the battery, and is formed in a range outside the positive electrode terminal of the battery but inside an outer circumferential surface of the battery in a radial direction of the battery.

In addition, it is preferable that the protruding section is configured to have an annular shape having a diameter that is larger than a diameter of the positive electrode terminal of the battery and is smaller than a diameter of the battery.

Moreover, it is preferable that a negative electrode relay terminal is provided which is provided on a bottom section of the battery storage part, a part of which is exposed from an outer bottom surface of the battery storage part, and which abuts on a negative electrode terminal of the battery in the battery storage part, the battery storage part has a recess section formed in the outer bottom surface, and the part of the negative electrode relay terminal exposed from the outer bottom surface is located in the recess section.

Hereinafter, the form of a battery spacer 2 to which the present disclosure has been applied is described with reference to the drawings.

Figure 1:
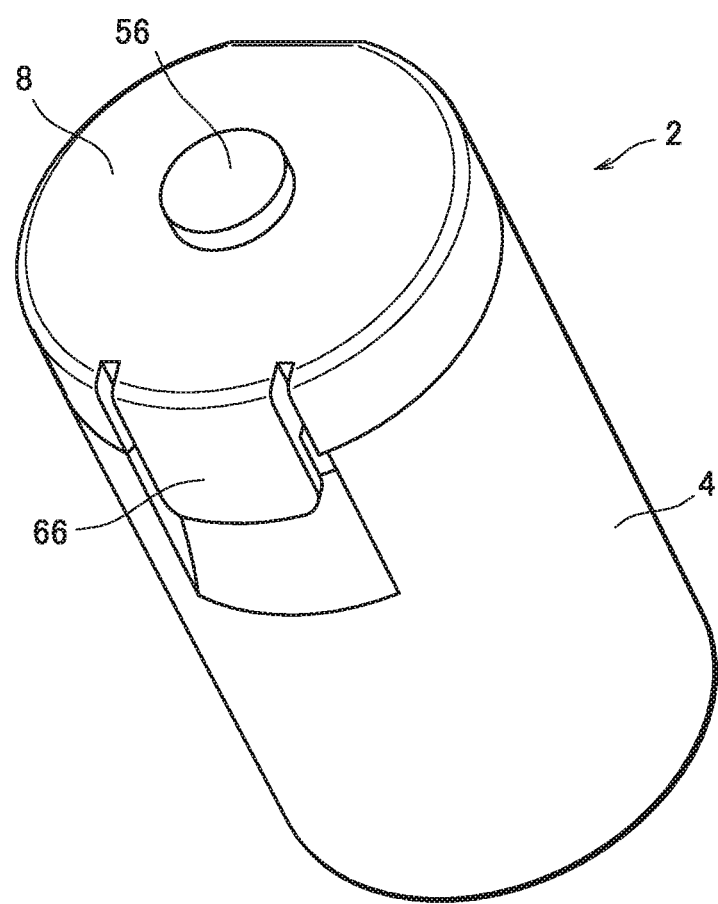
FIG. 1 is a perspective view showing a battery spacer according to an embodiment of the present disclosure.

As shown in FIG. 1, the battery spacer 2 entirely has a shape substantially the same as the shape of a cylindrical battery, and has, in the present embodiment, a shape substantially the same as the shape of a D size battery. The dimensions of parts of the battery spacer 2 are equal to those of a D size battery.

Figure 2:
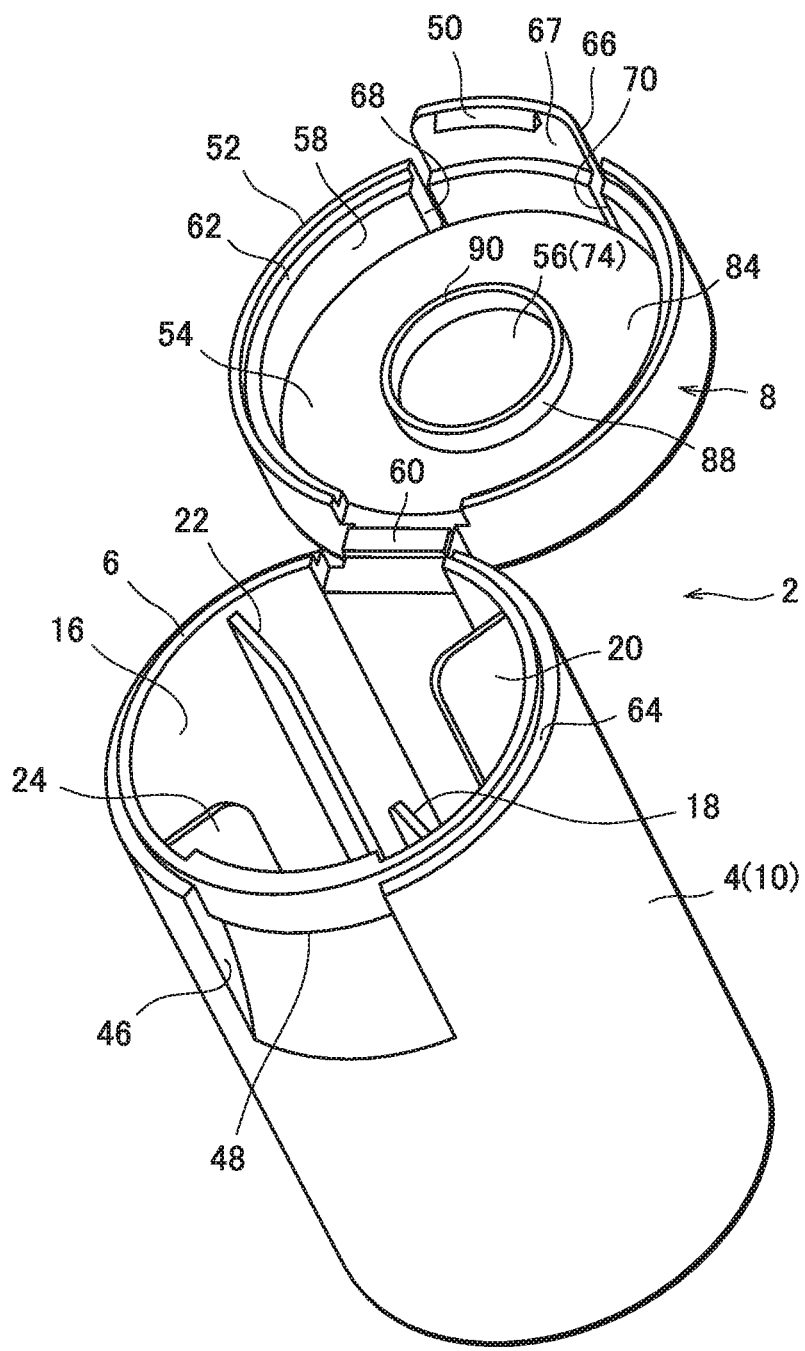
FIG. 2 is a perspective view showing an aspect of the battery spacer in FIG. 1 with a lid part thereof open.

As clearly shown in FIG. 2, the battery spacer 2 includes a storage case (battery storage part) 4 having a bottomed cylindrical shape in which a battery 3 is stored, and a lid part 8 which closes an opening 6 of the storage case 4.

The storage case 4 includes a case body 10 and a negative electrode relay terminal 14 attached to a bottom wall 12 of the case body 10.

The case body 10 is made from resin and has a bottomed cylindrical shape. As clearly shown in FIGS. 2 and 3, an inner circumferential wall 16 of the case body 10 is provided with a first hold plate 18, a second hold plate 20, a third hold plate 22, and a fourth hold plate 24 each having a thin plate-like shape. The first hold plate 18, the second hold plate 20, the third hold plate 22, and the fourth hold plate 24 are arranged at an equal interval in the circumferential direction. Respective ends 18a, 20a, 22a, and 24a of the hold plates are directed to the center axis of the case body 10. Accordingly, the first hold plate 18 is opposed to the third hold plate 22, and the second hold plate 20 is opposed to the fourth hold plate 24. In the present embodiment, each of a space between the end 18a of the first hold plate 18 and the end 22a of the third hold plate 22 opposed to each other and a space between the end 20a of the second hold plate 20 and the end 24a of the fourth hold plate 24 opposed to each other is equal in dimension to the diameter of the AA size battery 3.

Figure 3:
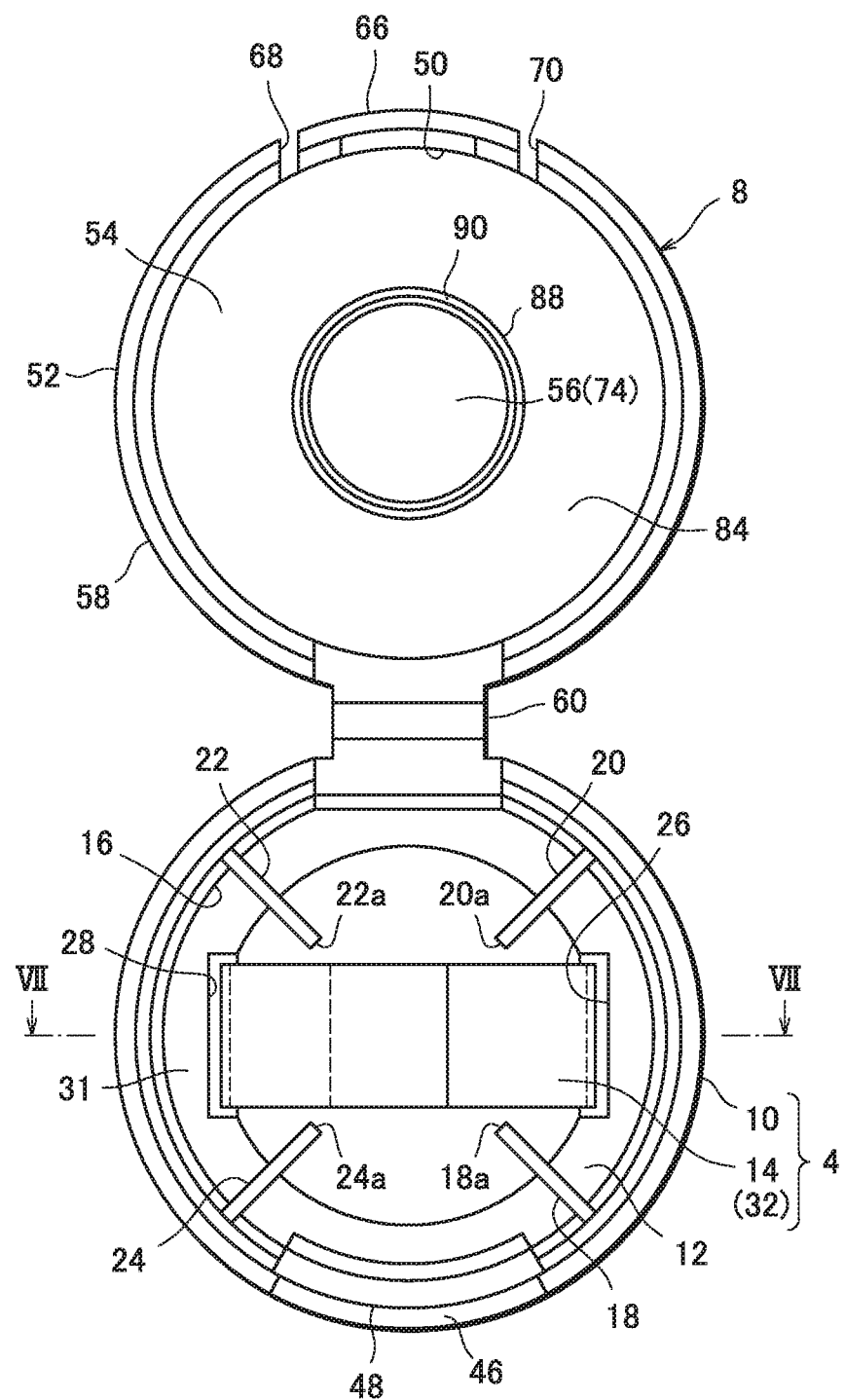
FIG. 3 is a plan view showing the aspect of the battery spacer in FIG. 1 with the lid part thereof open.

As shown in FIG. 3, in the bottom wall 12 of the case body 10, a pair of slits 26, 28 are provided between the first hold plate 18 and the second hold plate 20 and between the third hold plate 22 and the fourth hold plate 24, so as to extend from an inner bottom surface 31 to an outer bottom surface 33 of the bottom wall 12 of the case body 10. The slits 26, 28 are long and linear through holes.

Figure 4:
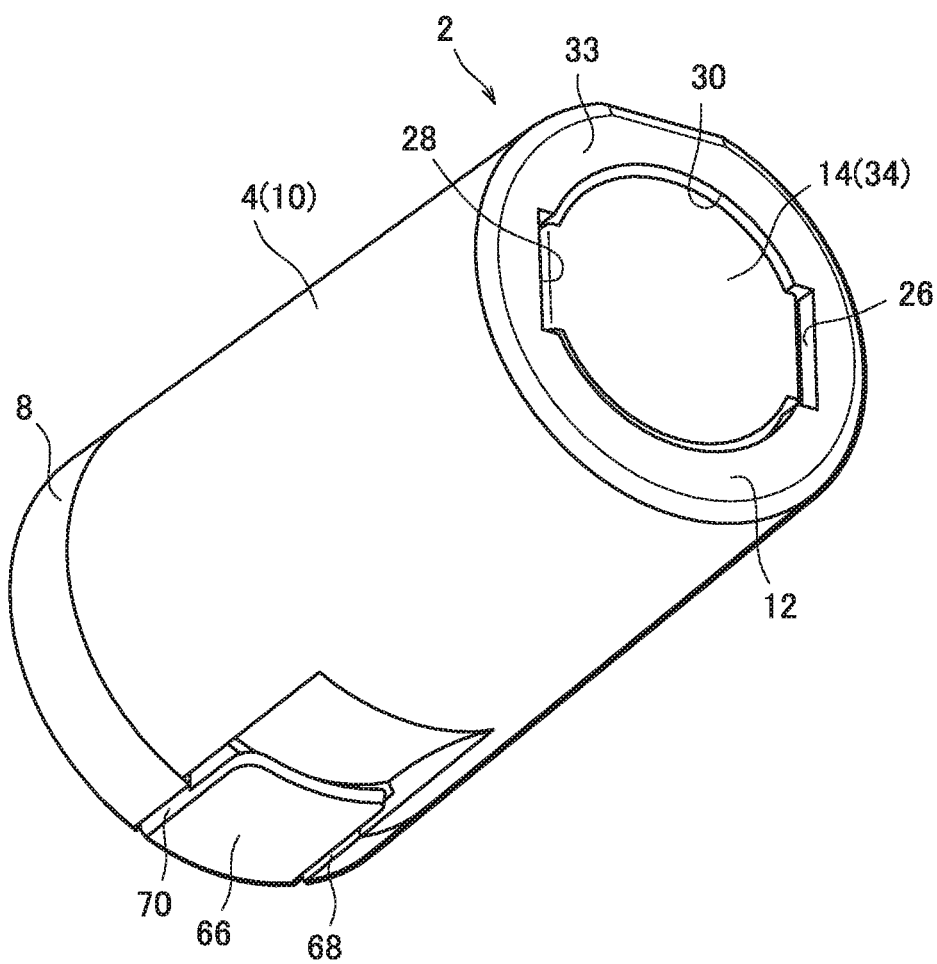
FIG. 4 is a perspective view showing the battery spacer according to the embodiment of the present disclosure in such a way that a bottom wall of the battery spacer can be seen.

Further, as shown in FIG. 4, a substantially circular recess section 30 is provided in the outer bottom surface 33 of the bottom wall 12 of the case body 10. Here, as clearly shown in FIG. 4, the pair of slits 26, 28 are located at both sides of the recess section 30.

The negative electrode relay terminal 14 includes an inner negative electrode terminal section 32 located at the inner bottom surface 31 side of the bottom wall 12 of the case body 10, and an outer negative electrode terminal section 34 exposed from the outer bottom surface 33 of the bottom wall 12 of the case body 10.

Figure 5:
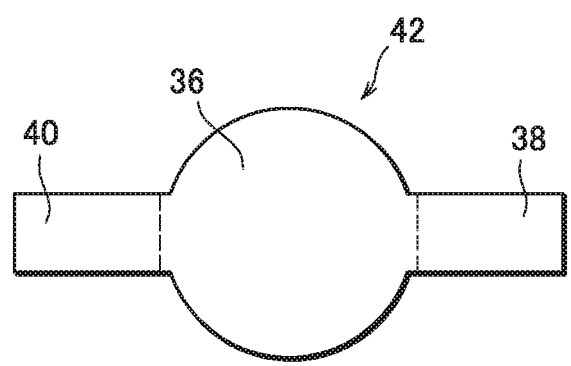
FIG. 5 is a plan view showing a thin plate member to become a negative electrode relay terminal.
Figure 6:
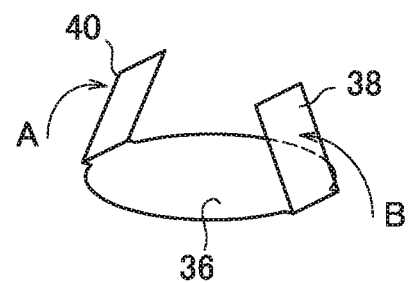
FIG. 6 is a perspective view showing the thin plate member to become the negative electrode relay terminal.

Hereinafter, a procedure for manufacturing the negative electrode relay terminal 14 is described. First, a metallic thin plate is punched so that a thin plate member 42 that includes a disc section 36 having a circular shape in a plan view and includes band-like sections 38, 40 extending radially outward from both sides of the disc section 36 and each having a rectangular shape in a plan view, is prepared, as shown in FIG. 5. For example, an iron thin plate having a nickel-plated surface is used as the metallic thin plate. As shown in FIG. 6, the band-like sections 38, 40 of the obtained thin plate member 42 are bent toward the directions of arrow A and arrow B, respectively. Here, the disc section 36 has a shape and dimensions adaptable to the recess section 30, and the band-like sections 38, 40 are formed at positions so as to be adaptable to the slits 26, 28.

Figure 7:
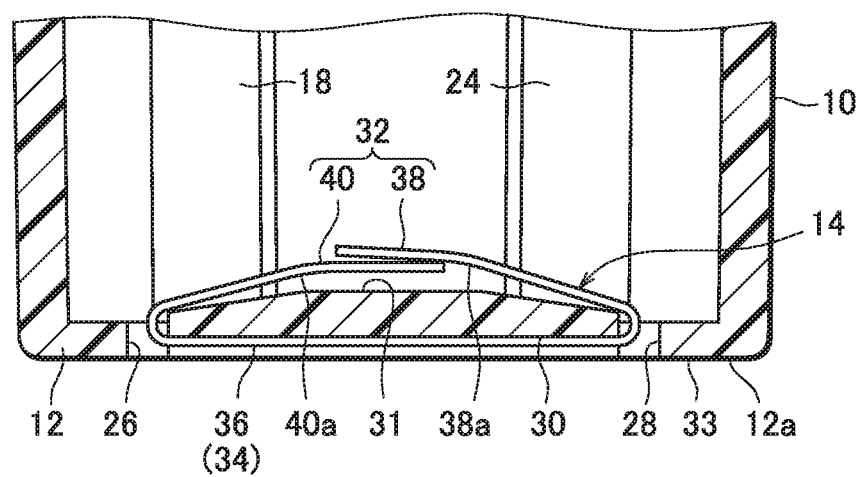
FIG. 7 is a cross-sectional view taken along line VII-VII in FIG. 3.

In the thin plate member 42 the bent band-like sections 38, 40 of which have been bent as described above, the band-like sections 38, 40 are inserted from the outer bottom surface 33 side of the bottom wall 12 of the case body 10 into the slits 26, 28. Next, the disc section 36 is pressed against the recess section 30. As shown in FIG. 7, a pair of the band-like sections 38, 40 having been caused to protrude to the maximum toward the interior of the case body 10 are further bent so as to be overlap each other. Here, the band-like sections 38, 40 are bent so as not to come into complete contact with the inner bottom surface 31 of the bottom wall 12, but to form a slight gap between the inner bottom surface 31 of the bottom wall 12 and lower surfaces 38a, 40a of the band-like sections 38, 40. As a result, spring properties are provided to the band-like sections 38, 40.

In the aforementioned manner, the thin plate member 42 is attached to the bottom wall 12 of the case body 10, and become the negative electrode relay terminal 14. In the negative electrode relay terminal 14, the band-like sections 38, 40 located in the case body 10 become the inner negative electrode terminal section 32 which abuts on a negative electrode terminal 7 of the battery 3 stored in the case body 10. The inner negative electrode terminal section 32 has spring properties. In contrast, the disc section 36 located in the recess section 30 becomes the outer negative electrode terminal section 34 which comes into contact with a negative electrode side contact provided to the interior of a battery chamber of an electric apparatus when the battery spacer 2 is loaded in the battery chamber of the electric apparatus.

The outer negative electrode terminal section 34 is located in the recess section 30 which is provided in the exterior side of the bottom wall 12 of the case body 10, and is located at a position retracted from a part, of the bottom wall 12, other than the recess section 30, that is, a position retracted from a lowermost surface 12a of the outer bottom surface 33 of the bottom wall 12. Accordingly, an advantageous effect of preventing incorrect contact with another portion of a battery chamber than a negative electrode side contact is provided.

The negative electrode relay terminal 14 including the inner negative electrode terminal section 32 and the outer negative electrode terminal section 34 is formed of one metallic thin plate, and has an integrated structure. For this reason, the inner negative electrode terminal section 32 and the outer negative electrode terminal section 34 are electrically conducted to each other.

In addition, as clearly shown in FIG. 2, the case body 10 has an outer circumferential recess section 46 at a position, in the outer circumferential surface thereof, close to the opening 6. A step 48 is provided at the upper end of the outer circumferential recess section 46. The area of the step 48 is engaged with a lock claw 50 of the lid part 8 (described later). That is, the outer circumferential recess section 46 and the lock claw 50 in association with each other form a lock mechanism of the battery spacer 2.

The lid part 8 includes a lid body 52 which matches the opening 6 of the storage case 4 and is able to close the opening 6, and a positive electrode relay terminal 56 attached to a top wall 54 of the lid body 52.

Figure 8:
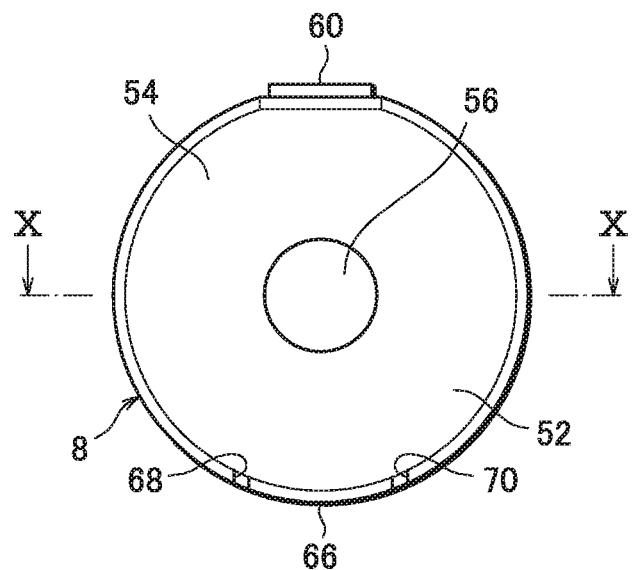
FIG. 8 is a plan view showing an aspect of the battery spacer according to the embodiment of the present disclosure, when viewed from the lid part side.
Figure 9:
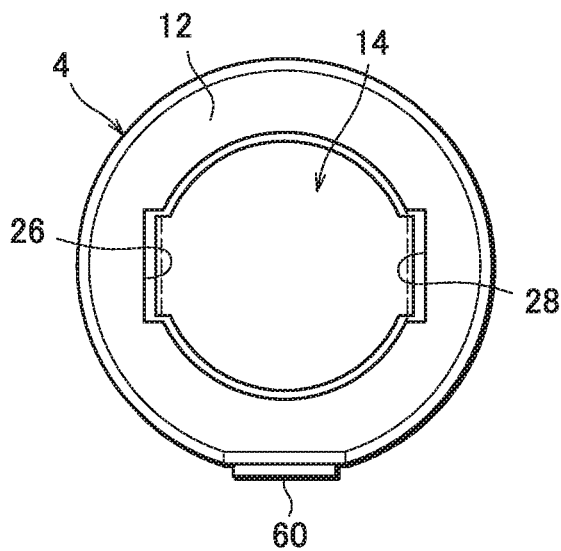
FIG. 9 is a plan view showing an aspect of the battery spacer according to the embodiment of the present disclosure, when viewed from the bottom wall side.

The lid body 52 is made from resin. As shown in FIG. 2, the lid body 52 includes the disc-like top wall 54, and a circumferential wall 58 which, when the opening 6 of the storage case 4 is closed, extends from the outer circumferential edge of the top wall 54 to the storage case 4 side. As shown in FIG. 2, the lid body 52 is coupled with the storage case 4 via a hinge 60, and is able to open and close the opening 6 of the storage case 4. Here, as shown in FIG. 8 showing an aspect of the battery spacer 2 when viewed from above (the lid part 8 side) and in FIG. 9 showing an aspect of the battery spacer 2 when viewed from below (the bottom wall 12 side of the case body 10), an area where the hinge 60 exists on the outer circumferential surface of the lid part 8 and the outer circumferential surface of the storage case 4 is formed into a flat shape such that the opening and closing operation of the hinge 60 is allowed.

A step 62 is provided at an end of the circumferential wall 58. More specifically, the circumferential wall 58 is in a state where the inner circumferential side thereof is retracted further toward the top wall 54 than the outer circumferential side. On the other hand, a step 64 is provided at the circumferential edge of the opening 6 of the storage case 4 so as to match the step 62 at the end of the circumferential wall 58. More specifically, the inner circumferential side of the circumferential edge of the opening 6 protrudes further upward than the outer circumferential side.

Further, a tongue piece 66 which, when the lid body 52 is closed, extends toward the storage case 4 side is provided to a part of the circumferential wall 58. The tongue piece 66 is provided at a position corresponding to the outer circumferential recess section 46 of the case body 10. As shown in FIG. 2, cutouts 68, 70 extending toward the top wall 54 are provided in portions of the circumferential wall 58 at which the tongue piece 66 is provided. As a result, the tongue piece 66 is allowed to easily move outward in the radial direction of the battery spacer 2.

Moreover, the lock claw 50 is provided on an end of an inner circumferential surface 67 of the tongue piece 66. When the lid body 52 is closed, the lock claw 50 slightly extends inwardly in the radial direction of the battery spacer 2, and is engaged with the step 48 of the outer circumferential recess section 46 of the case body 10.

When the lid body 52 is to be opened by release of locking, the tongue piece 66 is pulled outwardly in the radial direction of the battery spacer 2 such that engagement between the lock claw 50 and the step 48 of the outer circumferential recess section 46 is released. Accordingly, the locking is released so that the lid body 52 can be opened.

Figure 10:
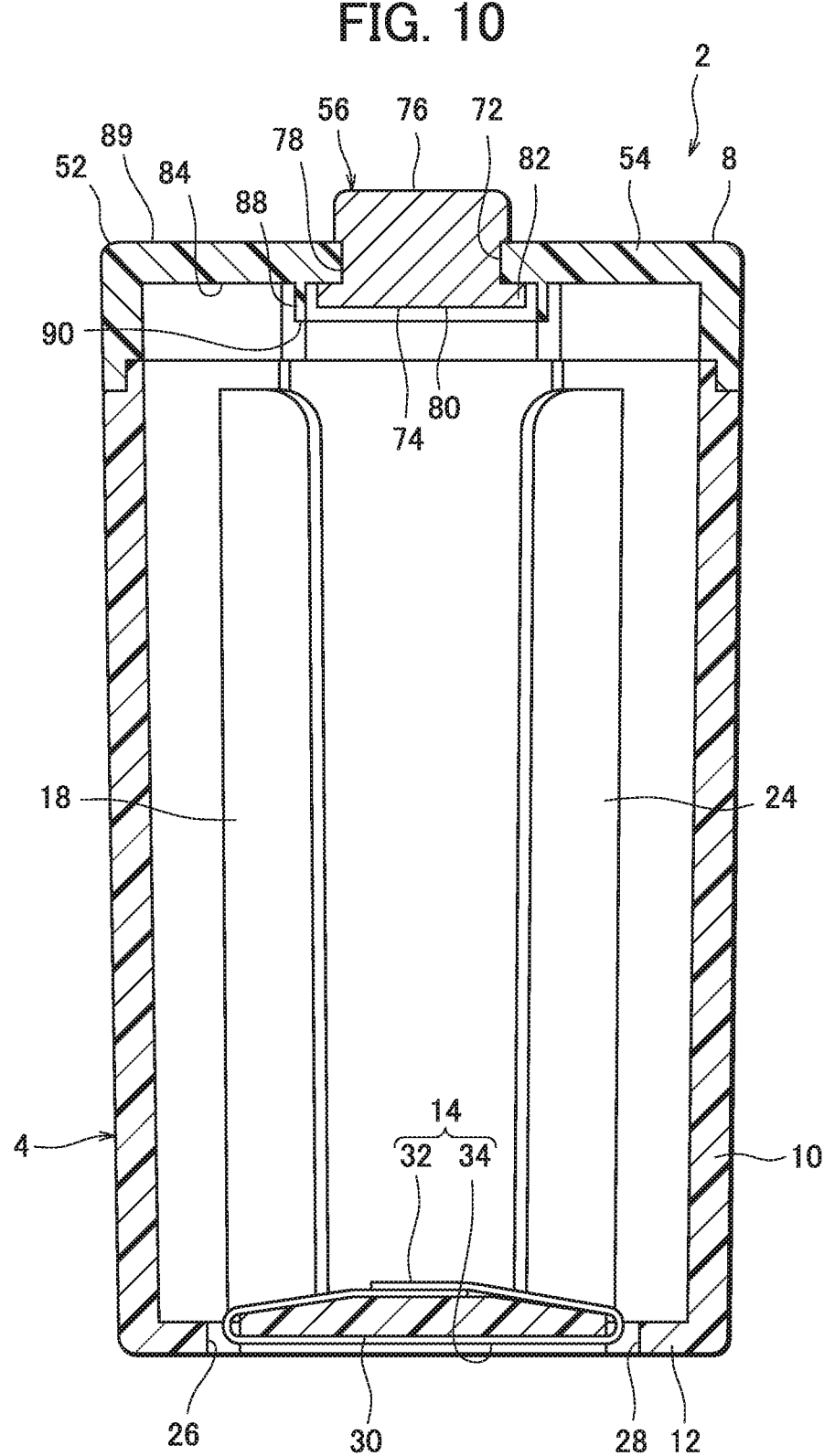
FIG. 10 is a cross-sectional view taken along line X-X in FIG. 8.

In addition, as shown in FIG. 10, a central through hole 72 is provided at the center of the top wall 54 of the lid body 52. The positive electrode relay terminal 56 is attached in the central through hole 72.

The positive electrode relay terminal 56 has a metallic columnar body having a step, and has a cross sectional shape shown in FIG. 10. For example, an iron columnar shape having a nickel-plated surface is used as the metallic columnar shape. Here, the positive electrode relay terminal 56 includes an inner positive electrode terminal section 74 located on an inner surface 84 of the top wall 54 of the lid body 52, an outer positive electrode terminal section 76 outwardly protruding from a top surface 89 of the top wall 54 of the lid body 52, and a small diameter section 78 located between the inner positive electrode terminal section 74 and the outer positive electrode terminal section 76.

The inner positive electrode terminal section 74 has a disc-like shape, is a section at which the outer diameter dimension of the positive electrode relay terminal 56 becomes the largest, and abuts on the positive electrode terminal 5 of the battery 3 stored in the case body 10. A surface, of the inner positive electrode terminal section 74, to abut on the positive electrode terminal 5 of the battery 3 is referred to as a terminal contact surface 80.

The outer positive electrode terminal section 76 has a columnar shape the outer diameter dimension of which is smaller than that of the area of the inner positive electrode terminal section 74. When the battery spacer 2 is loaded in a battery chamber of an electric apparatus, the outer positive electrode terminal section 76 comes into contact with a positive electrode side contact provided to the interior of the battery chamber of the electric apparatus. The outer positive electrode terminal section 76 is slightly tapered toward an end thereof.

The small diameter section 78 couples the inner positive electrode terminal section 74 to the outer positive electrode terminal section 76, and is engaged in the central through hole 72 in the lid body 52. The outer diameter dimension of the small diameter section 78 is substantially equal to the inner diameter dimension of the central through hole 72, and is slightly smaller than the largest outer diameter dimension of the outer positive electrode terminal section 76.

When the positive electrode relay terminal 56 is to be attached to the lid body 52, the outer positive electrode terminal section 76 is first pressed into the central through hole 72 in the top wall 54 of the lid body 52 from the inner surface 84 side of the top wall 54. While slightly expanding the diameter of the central through hole 72, the outer positive electrode terminal section 76 is inserted thereinto. When the outer positive electrode terminal section 76 has completely protruded to the outside from the top wall 54, the small diameter section 78 is fitted in the central through hole 72 and the upper surface of a large diameter section 82 of the inner positive electrode terminal section 74 is in close contact with the circumferential edge, of the central through hole 72, on the inner surface 84 of the top wall 54. In this way, the positive electrode relay terminal 56 is attached to the lid body 52.

Moreover, as shown in FIG. 2, an annular protruding section 88 is provided on the inner surface 84 of the top wall 54 of the lid body 52 so as to surround the inner positive electrode terminal section 74. When the lid body 52 is closed, the protruding section 88 protrudes toward the interior of the storage case 4, that is, toward the stored battery 3 side.

Figure 11:
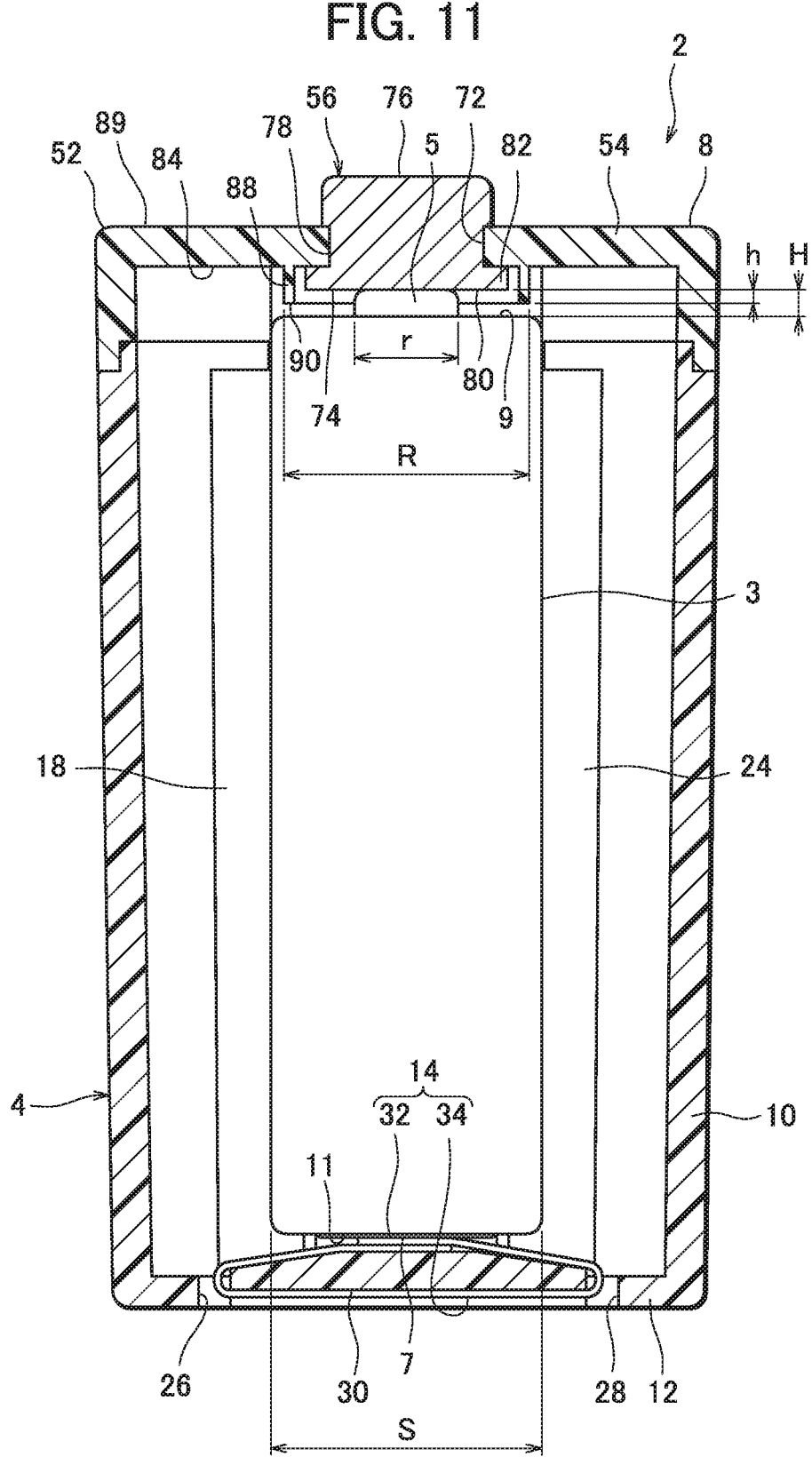
FIG. 11 is a cross-sectional view showing an aspect of the battery spacer in FIG. 8 in which a battery is stored.

As shown in FIG. 11, the protruding section 88 is formed so as to have a length (protruding length) h, in the axial direction of the battery 3, from the terminal contact surface 80 of the inner positive electrode terminal section 74 to an end 90 of the protruding section 88, shorter than the length, along the axis, of the positive electrode terminal 5 of the stored battery 3, that is, a length H from an end of the positive electrode terminal 5 of the battery 3 to a shoulder section 9 of the battery 3.

In addition, the diameter R of the protruding section 88 is set to be larger than the diameter r of the positive electrode terminal 5 of the stored battery 3, and to be smaller than the diameter S of the stored battery 3.

An intermediate product having a shape in which the case body 10 and the lid body 52 having the aforementioned structure are coupled with each other via the hinge 60 is produced by injection molding of a resin material. The negative electrode relay terminal 14 and the positive electrode relay terminal 56 are attached to the obtained intermediate product in accordance with the aforementioned procedure. As a result, the battery spacer 2 according to the present embodiment as shown in FIG. 1 is obtained.

In the obtained battery spacer 2, the lid part 8 is first opened as shown in FIG. 2, and the AA size battery 3 is inserted through the opening 6 of the storage case 4. Here, a negative electrode terminal 7 side of the battery 3 is first inserted into the storage case 4. Subsequently, the lid part 8 is closed so that the AA size battery 3 is stored in the battery spacer 2 with the negative electrode terminal 7 located at the bottom wall 12 side, as shown in FIG. 11. The stored battery 3 is held by the first hold plate 18, the second hold plate 20, the third hold plate 22, and the fourth hold plate 24 in the storage case 4. Here, the axis of the stored battery 3 substantially matches the axis of the battery spacer 2, and the battery 3 is located at the center of the battery spacer 2. Further, the negative electrode terminal 7 of the battery 3 abuts on the inner negative electrode terminal section 32 located at the inner side than the bottom wall 12 of the storage case 4. Since the inner negative electrode terminal section 32 is continuous with the outer negative electrode terminal section 34, the negative electrode terminal 7 of the battery 3 and the outer negative electrode terminal section 34 of the battery spacer 2 are electrically conducted to each other to have the same potential. Moreover, the inner negative electrode terminal section 32, which has spring properties, presses the battery 3 in a direction toward the lid part 8. As a result, the positive electrode terminal 5 of the battery 3 abuts on the inner positive electrode terminal section 74 of the lid body 52. Since the inner positive electrode terminal section 74 is continuous with the outer positive electrode terminal section 76, the positive electrode terminal 5 of the battery 3 and the outer positive electrode terminal section 76 of the battery spacer 2 are electrically conducted to each other to have the same potential.

Here, when the battery 3 is stored in a normal direction with the negative electrode terminal 7 of the battery 3 located at the bottom wall 12 side of the storage case 4 and with the positive electrode terminal 5 of the battery 3 located at the lid part 8 side, the protruding section 88 provided on the top wall 54 of the lid body 52 does not abut on the shoulder section 9 surrounding the positive electrode terminal 5 of the battery 3, and thus, the positive electrode terminal 5 of the battery 3 and the terminal contact surface 80 of the inner positive electrode terminal section 74 are in favorable contact with each other.

The battery spacer 2 in this state is loaded in a battery chamber of an electric apparatus, the outer negative electrode terminal section 34 comes into contact with a negative electrode side contact in the battery chamber, the outer positive electrode terminal section 76 comes into contact with a positive electrode side contact in the battery chamber, whereby the electric apparatus is driven. That is, the electric apparatus for D size batteries can be normally driven with use of the AA size battery 3 having undergone size conversion to a D size battery.

Figure 12:
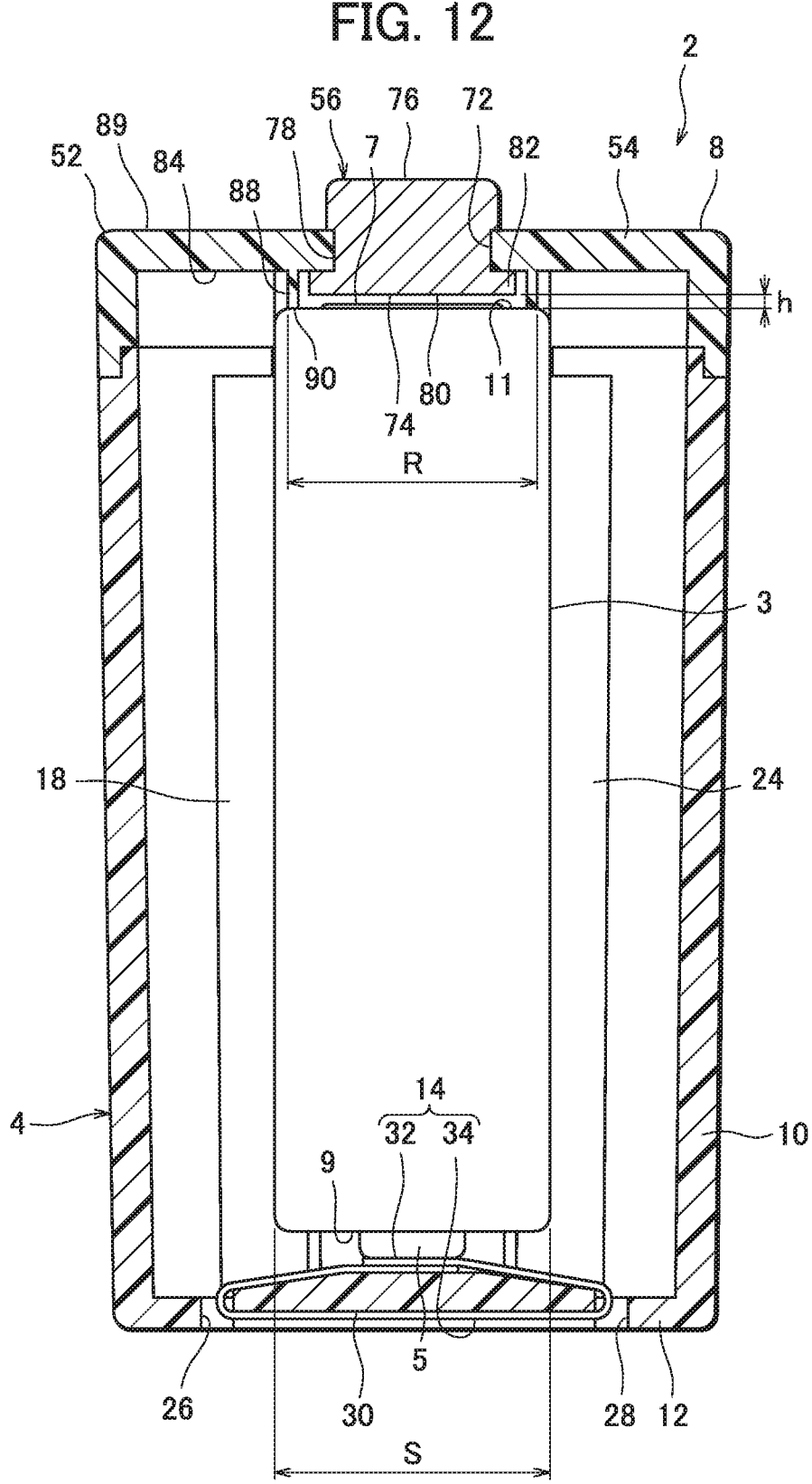
FIG. 12 is a cross-sectional view showing an aspect of the battery spacer in FIG. 8 in which a battery is stored in a direction opposite to a normal direction.

On the other hand, when the AA size battery 3 in a direction opposite to the normal direction, that is, the battery 3 with the positive electrode terminal 5 located at the bottom wall 12 side of the storage case 4 and with the negative electrode terminal 7 located at the lid part 8 side, is incorrectly inserted in the battery spacer 2, the positive electrode terminal 5 of the battery 3 abuts on the inner negative electrode terminal section 32 located at the inner side than the bottom wall 12 of the case body 10, as shown in FIG. 12. Since the inner negative electrode terminal section 32 has spring properties, the inner negative electrode terminal section 32 presses the battery 3 in the direction toward the lid part 8. The annular protruding section 88 surrounds the inner positive electrode terminal section 74 of the lid part 8, and the diameter R of the protruding section 88 is smaller than the diameter S of the AA size battery 3. Thus, an end surface section 11 on the negative electrode terminal 7 side of the pressed battery 3 abuts on the end 90 of the protruding section 88. Here, the terminal contact surface 80 of the inner positive electrode terminal section 74 of the lid part 8 is located at the position retracted from the end 90 of the protruding section 88 by the length h, and further, the negative electrode terminal 7 of the battery 3 is substantially flush with the end surface section 11, and the height of the negative electrode terminal 7 is shorter than the length h. Therefore, contact between the negative electrode terminal 7 of the battery 3 and the inner positive electrode terminal section 74 is prevented.

Accordingly, even when a user incorrectly inserts, into the battery spacer 2, the AA size battery 3 in the direction opposite to the normal direction, and loads the battery spacer 2 into a battery chamber of an electric apparatus, without noticing the incorrect insertion, current in a direction opposite to the normal direction can be prevented from flowing through the electric apparatus, whereby a failure of the electric apparatus can be avoided.

The present disclosure is not limited to the aforementioned embodiment, and various modification thereof can be made. In the aforementioned embodiment, the protruding section 88 has an annular shape. However, the shape of the protruding section 88 is not limited to a particular shape, and the protruding section 88 may be a small piece protrusion. Also, the number of such small piece protrusions is not limited to a particular number as long as at least one small piece protrusion is provided. In this case, each of the small piece protrusions as the protruding sections 88 needs to have the length (protruding length) h, in the axial direction of the stored battery 3, from the terminal contact surface 80 of the inner positive electrode terminal section 74 to the end 90 of the small piece (protruding section), shorter than the length H, along the axis, of the positive electrode terminal 5 of the stored battery 3, and needs to be formed in a range outside the positive electrode terminal 5 of the battery 3 but inside the outer circumferential surface of the battery 3 with respect to the diameter direction of the stored battery 3.

In the aforementioned embodiment, the size of the battery spacer 2 is equal to the size of a D size battery, and a battery to be stored therein is the AA size battery 3. However, a combination of the size of the battery spacer 2 and the size of the battery 3 to be stored is not limited to this, and other combinations can be adopted. Examples of the combination include a combination of the D size battery spacer 2 and the C size battery 3 to be stored, a combination of the D size battery spacer 2 and the AAA size battery 3 to be stored, a combination of the C size battery spacer 2 and the AAA size battery 3 to be stored, and a combination of the AA size battery spacer 2 and the AAA size battery 3 to be stored.

An advantage of the battery spacer of the present disclosure is, even when a battery is inserted with positive and negative electrodes of the battery incorrectly directed, contact between a positive electrode relay terminal and a negative electrode terminal of the battery can be prevented by a protruding section, so that a failure of an electric apparatus can be prevented.

EXPLANATION OF REFERENCE SIGNS

2 . . . battery spacer
3 . . . battery
4 . . . storage case
6 . . . opening
8 . . . lid part
10 . . . case body
12 . . . bottom wall
14 . . . negative electrode relay terminal
52 . . . lid body
54 . . . top wall
56 . . . positive relay terminal
88 . . . protruding section

The invention claimed is:

1. A battery spacer comprising:
a battery storage part having a bottomed cylindrical shape in which a battery is stored;
a lid part which closes an opening of the battery storage part; and
a positive electrode relay terminal which is provided to the lid part, a part of which protrudes from a top surface of the lid part, and which abuts on a positive electrode terminal of the battery in the battery storage part, wherein
the lid part has a protruding section formed which protrudes further toward a battery side than a surface of the positive electrode relay terminal to abut on the positive electrode terminal of the battery, and
the protruding section has a protruding length, in an axial direction of the battery, from the surface of the positive electrode relay terminal to abut on the positive electrode terminal of the battery, shorter than a length of the positive electrode terminal of the battery, and is formed in a range outside the positive electrode terminal of the battery but inside an outer circumferential surface of the battery in a radial direction of the battery, wherein
the protruding section has an annular shape having a diameter that is larger than a diameter of the positive electrode terminal of the battery and is smaller than a diameter of the battery, and radially surrounds the surface of the positive electrode relay terminal to abut on the positive electrode terminal of the battery.

2. The battery spacer according to claim 1, further comprising:
a negative electrode relay terminal which is provided on a bottom section of the battery storage part, a part of which is exposed from an outer bottom surface of the battery storage part, and which abuts on a negative electrode terminal of the battery in the battery storage part, wherein
the battery storage part has a recess section formed in the outer bottom surface, and
the part of the negative electrode relay terminal exposed from the outer bottom surface of the battery storage part is located in the recess section.

* * * * *